US012705389B2

(12) United States Patent
Anand et al.

(10) Patent No.: US 12,705,389 B2
(45) Date of Patent: Aug. 11, 2026

(54) MITIGATING PRIVATE DATA LEAKAGE IN A FEDERATED LEARNING SYSTEM

(71) Applicant: Intel Corporation, Santa Clara, CA (US)

(72) Inventors: Jerome Anand, Bangalore (IN); Anil Kumar Bangalore Rajashekar, Bengaluru (IN); Dinkar Dhawale, Bengaluru (IN); Sachin P. Kamat, Bangalore (IN); Shidlingeshwar Khatakalle, Gadhinglaj (IN); Mitul Shah, Bengaluru (IN)

(73) Assignee: INTEL CORPORATION, Santa Clara, CA (US)

( * ) Notice: Subject to any disclaimer, the term of this patent is extended or adjusted under 35 U.S.C. 154(b) by 187 days.

(21) Appl. No.: 17/993,634

(22) Filed: Nov. 23, 2022

(65) Prior Publication Data

US 2024/0169094 A1 May 23, 2024

(51) Int. Cl.
*G06F 21/62* (2013.01)
*G06N 20/00* (2019.01)

(52) U.S. Cl.
CPC ......... *G06F 21/6254* (2013.01); *G06N 20/00* (2019.01)

(58) Field of Classification Search
None
See application file for complete search history.

(56) References Cited

U.S. PATENT DOCUMENTS 11,886,989 B2 * 1/2024 Gu ........................... G06N 3/08
12,056,582 B2 * 8/2024 Ren ....................... H04L 9/3073
12,086,546 B2 * 9/2024 Meyerzon ............. G06F 16/906
2022/0019868 A1 * 1/2022 Klein .................... G06F 18/214
2024/0028950 A1 * 1/2024 Saha .................... G06N 3/0464
2024/0046107 A1 * 2/2024 Chi ........................ G06N 3/088
2024/0048360 A1 * 2/2024 Dai ........................ G06N 20/00
2024/0320507 A1 * 9/2024 Chalkidis .............. G06N 3/045

FOREIGN PATENT DOCUMENTS

CN 113591145 B * 2/2024 ......... G06F 21/6245
EP 4083838 A1 * 11/2022 ............. G06N 3/045
WO WO-2023050754 A1 * 4/2023 ........... G06F 18/214

* cited by examiner

*Primary Examiner* — Trang T Doan
(74) *Attorney, Agent, or Firm* — JAFFERY WATSON HAMILTON & DESANCTIS LLP

(57) ABSTRACT

Protecting data privacy in a federated learning computing environment includes receiving a model trained by a federated server with public data using global model parameters, getting local shareable data from a local shareable database, training the model with the local shareable data using the global model parameters to generate local model parameters, and obscuring the local model parameters. Protecting data privacy includes sending the local model parameters to the federated server, modifying the model to classify private data, and training the model with the private data using the local model parameters and updating the local model parameters.

12 Claims, 8 Drawing Sheets

MITIGATING PRIVATE DATA LEAKAGE IN A FEDERATED LEARNING SYSTEM

FIELD OF THE DISCLOSURE

This disclosure relates generally to security in computing systems, and more particularly, to mitigating private data leakage in a federated learning system in computing systems.

BACKGROUND

In a federated learning scenario, a model (e.g., an artificial intelligence (AI)/machine learning (ML) model) is trained on a client device using data which is available only at the client device. In current solutions, the client device sends the trained models and model parameters such as weights and/or activations back to a centralized federated server for subsequent aggregation and updating of the model. By doing so, data utilized for training only at the client device may be inferred or reconstructed back at the centralized federated server, potentially leading to privacy violations and/or data leakage problems.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
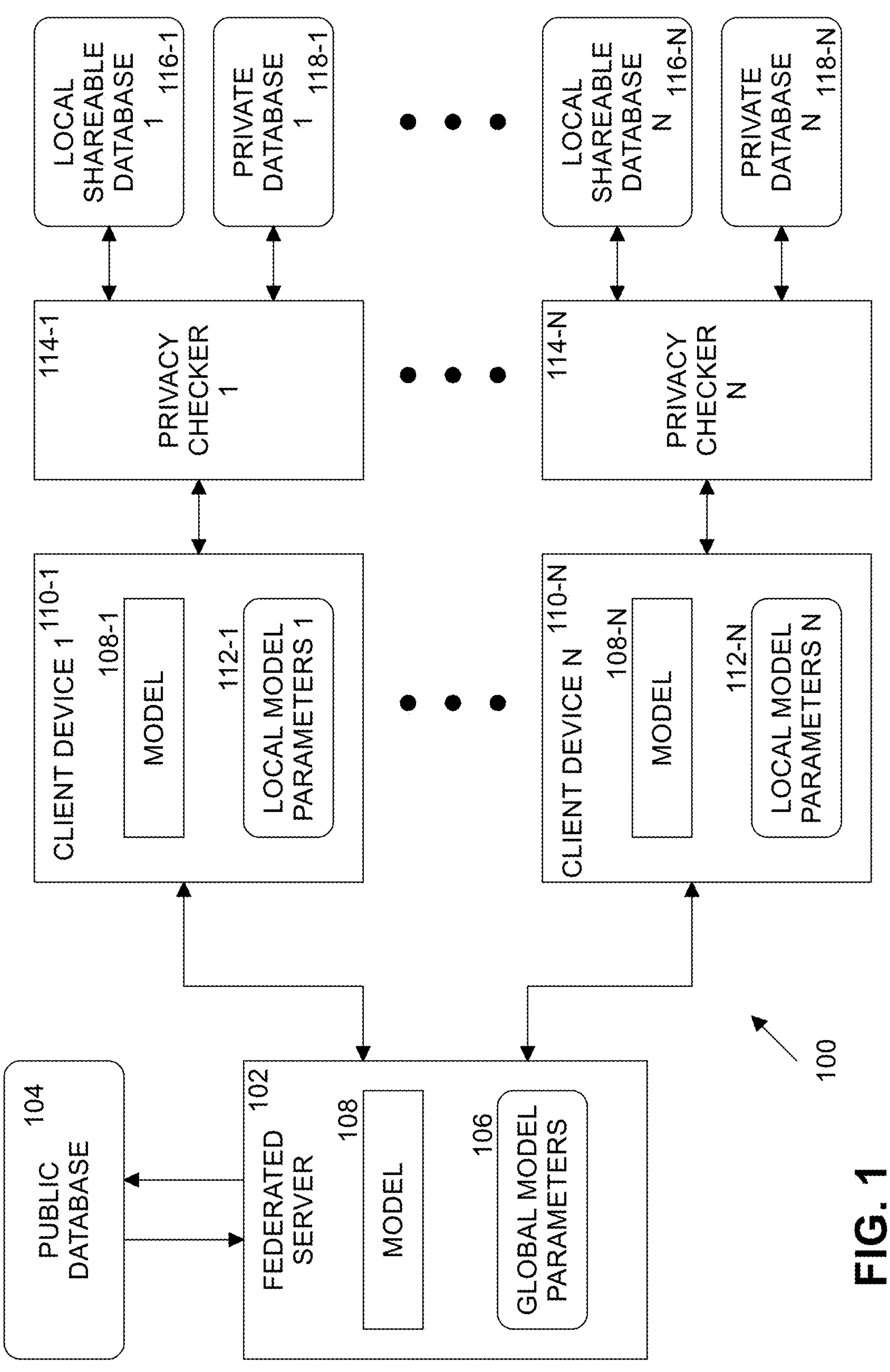
FIG. 1 illustrates a federated learning computing environment providing improved data privacy according to an implementation.

The technology described herein provides a method, system and apparatus to improve data privacy in a federated learning computing environment.

Federated learning is a ML technique that trains a learning process across multiple decentralized client devices having local data sets. Federated learning enables multiple client devices to build a common, robust ML model without sharing data sets, thus addressing issues such as data privacy, data security, data access rights and access to heterogeneous data. Federated learning trains a ML model (e.g., deep neural networks) on multiple local datasets contained in client devices without explicitly exchanging data samples. A general principle of federated learning is the training of local models by client devices using local data samples and exchanging model parameters (e.g., the weights and biases of a deep neural network) between the client devices at some frequency to generate a global model shared by all client devices.

In a centralized federated learning computing environment, a central federated server orchestrates performance of the learning process and coordinates participating client devices during the learning process. The federated server is responsible for selection of client devices at the beginning of the training process and for the aggregation of model and/or model parameters updates received from the participating client devices. Some implementations include a large set of heterogeneous client devices (e.g., smartphones, tablet computers, laptop computers, and Internet of Things (IoT) devices, etc.) with different computation and communication capabilities while still producing an accurate global ML model.

To ensure good task performance of a global ML model, federated learning relies on an iterative process broken up into an atomic set of client-server interactions known as a federated learning round. Each round of this process consists in transmitting the current global model state and current global model parameters to participating client devices, training local models on these local client devices to produce a set of potential model updates at each client device, and then aggregating and processing these local updates into a global update and applying the global update to the global model and global model parameters.

In the existing general methodology of federated learning, a central federated server is used for aggregation, while local client devices perform local training of the model. First, a ML model is initialized at the federated server. Client devices are activated and wait for the federated server to assign computation tasks. One or more client devices are selected to start training the model. The selected client devices acquire the current model while the other client devices may wait to participate in another federated round of learning. Selected client devices train the model on their local data. The client devices send their model and updated local model parameters back to the federated server. The federated server aggregates the received models and local model parameters for a next round of learning with the updated model and model parameters. Learning rounds continue until termination criteria is reached and the model and model parameters are finalized.

However, when the client devices send their updated local model parameters to the federated server, local data used to train the model at the client devices may be inferred at the federated server or if captured during communication from the client devices to the federated server, resulting in potential privacy problems. In an implementation, the technology described herein does not send private data from client devices to the federated server and local data cannot be inferred from communicated local model parameters, thereby improving the privacy aspects of the federated learning computing environment.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor" or "processing device" or "processor circuitry" or "hardware resources" are defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, intellectual property (IP) blocks, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s). As used herein, a device may comprise processor circuitry or hardware resources.

As used herein, a computing system can be, for example, a server, a disaggregated server, a personal computer, a workstation, a self-learning machine (e.g., a neural network), a mobile device (e.g., a cell phone, a smart phone, a tablet (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, an electronic voting machine, or any other type of computing device.

FIG. 1 illustrates a federated learning computing environment 100 providing improved data privacy according to an implementation. Federated learning computing environment 100 includes federated server 102, which may be implemented in any type of computing system described above. Federated server 102 includes model 108, which may be any kind of AI/ML model. Federated server 102 trains model 108 using public data obtained from at least a portion of public database 104 and global model parameters 106. Federated server 102 accesses public data from public database 104 over any communications mechanism (e.g., a network, the Internet, etc.). In an implementation, global model parameters may include model weights, activation values, model coefficients, hyper parameters (e.g., learning rate, momentum, mini batch size, epochs, etc.), normalization strategies, regularization strategies, and other parameters. Federated learning computing environment 100 includes a plurality of client devices 1 . . . N operating substantially in parallel, where N is a natural number. Federated server 102 and the client devices communicate over any mechanism for transferring commands and data between each other, such as the Internet, an intranet, a wide area network (WAN), a local area network (LAN) a cellular telephone network, etc., the details of which are omitted for clarity. Each client device, operating on the "edge" of the federated learning computing environment, may be implemented in any type of computing system described above. Client device 1 110-1 . . . client device N 110-N includes a copy of model 108-1 . . . 108-N and unique local model parameters 112-1 . . . 112-N.

As described in more detail below, each client device interacts with privacy checker software and/or hardware to access data from a local shareable database and a private database. For example, client device 1 110-1 interacts with privacy checker 1 114-1 to access data from local shareable database 1 116-1 and private database 118-1, . . . client device N 110-N interacts with privacy checker N 114-N to access data from local shareable database N 116-N and private database 118-N. In an implementation, the privacy checkers are implemented as running on or otherwise integral with respective client devices. In another implementation, the privacy checkers are implemented as running on or otherwise integral with one or more other computing systems accessible by the respective client devices over a network (such as the Internet, for example).

In an implementation, the local shareable databases and private databases are implemented as running on or otherwise integral with respective client devices. In another implementation, the local shareable databases and private databases are implemented as running on or otherwise integral with one or more other computing systems accessible by the respective privacy checkers and/or client devices over a network (such as the Internet, for example). In an implementation, each local shareable database comprises a portion of public database 104. In an implementation, the portion of the public database 104 in a local shareable database is different than one or more other local shareable databases. In an implementation, each private database is different than private databases associated with other privacy checkers and/or client devices (e.g., they each store data private to the associated client device).

A client device runs software to train the model using local model parameters and data obtained by a privacy checker from the local shareable database and to train the model using local model parameters and data obtained by the privacy checker from the private database. A privacy checker analyzes and segregates data from a local shareable database and a private database. Privacy checker analyzes data to determine whether the data can be shared. If the privacy checker determines that the data cannot be shared, the privacy checker labels the data as private data. The privacy checker may perform data labelling or batching on the local data into private and non-private (shareable) portions. In an implementation, the privacy checker segregates data based at least in part on a set of predefined parameters and/or predefined features maintained by the client device (similar to rules, data inferred from usage patterns, manually classified data, etc.). In an implementation, private data is local only to a client device and cannot be shared with the federated server or other client devices.

A client device updates the model and local model parameters. In an implementation, a client device also updates one or more of the local shareable database and the private database. The client device sends updated and obscured local model parameters back to the federated server 102 for global aggregation with other local model parameters received from other client devices. For example, client device 1 110-1 trains the model 108-1 using local model parameters 1 112-1 and data obtained by a privacy checker 1 114-1 from the local shareable database 1 116-1 and trains the model using local model parameters 1 112-1 and data obtained by the privacy checker 1 114-1 from the private database 1 118-1. Privacy checker 1 114-1 analyzes and segregates data from local shareable database 1 116-1 and private database 1 118-1. Client device 1 110-1 updates the model 108-1 and local model parameters 112-1. Client device 1 110-1 sends updated and obscured local model parameters 1 112-1 back to the federated server 102. Similar processing is performed by other client devices. Furthermore, this processing may be performed iteratively in multiple subsequent rounds to update the model 108 based on the successive rounds of training.

Figure 2:
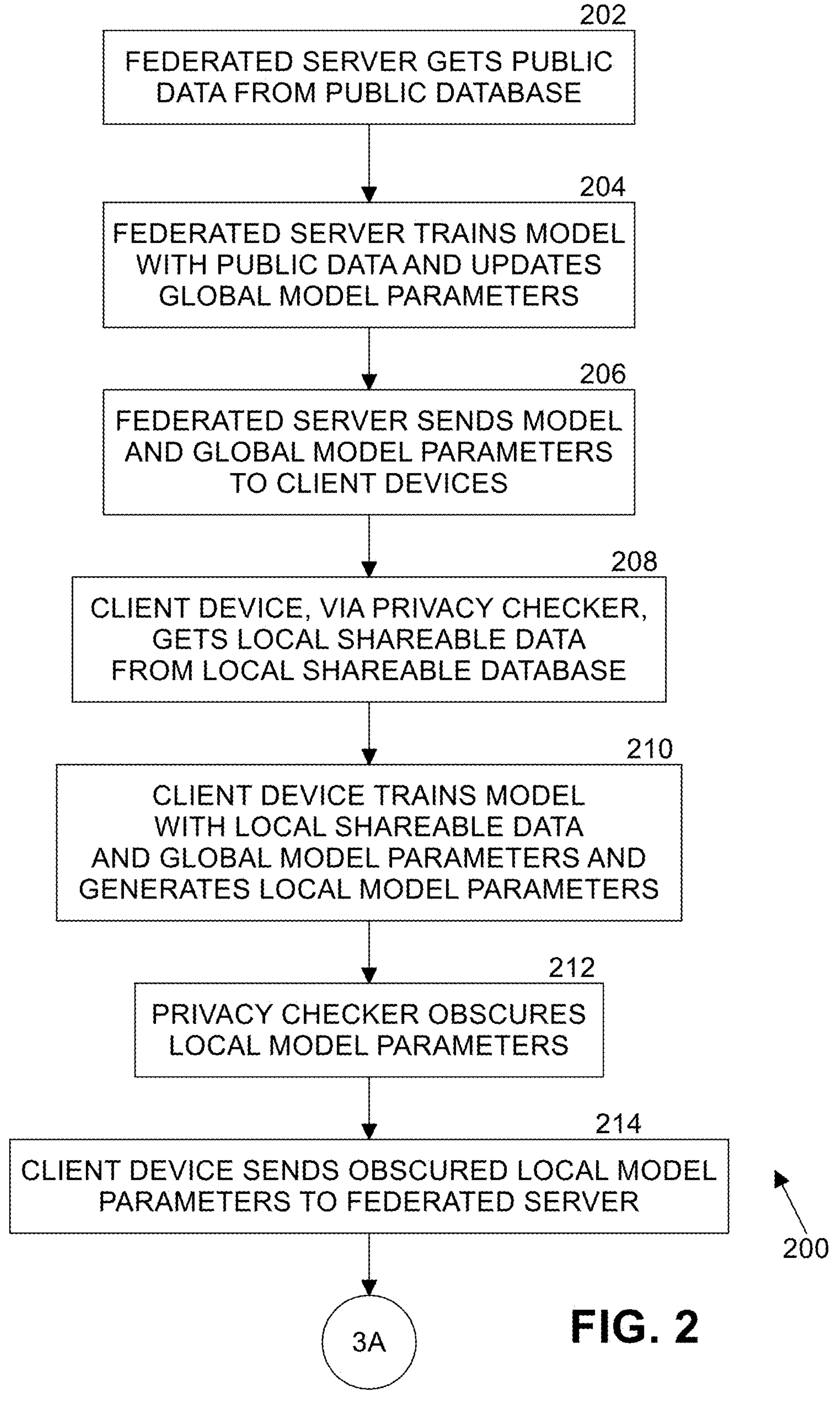
FIGS. 2 and 3 are diagrams of federated learning processing according to an implementation.
Figure 3:
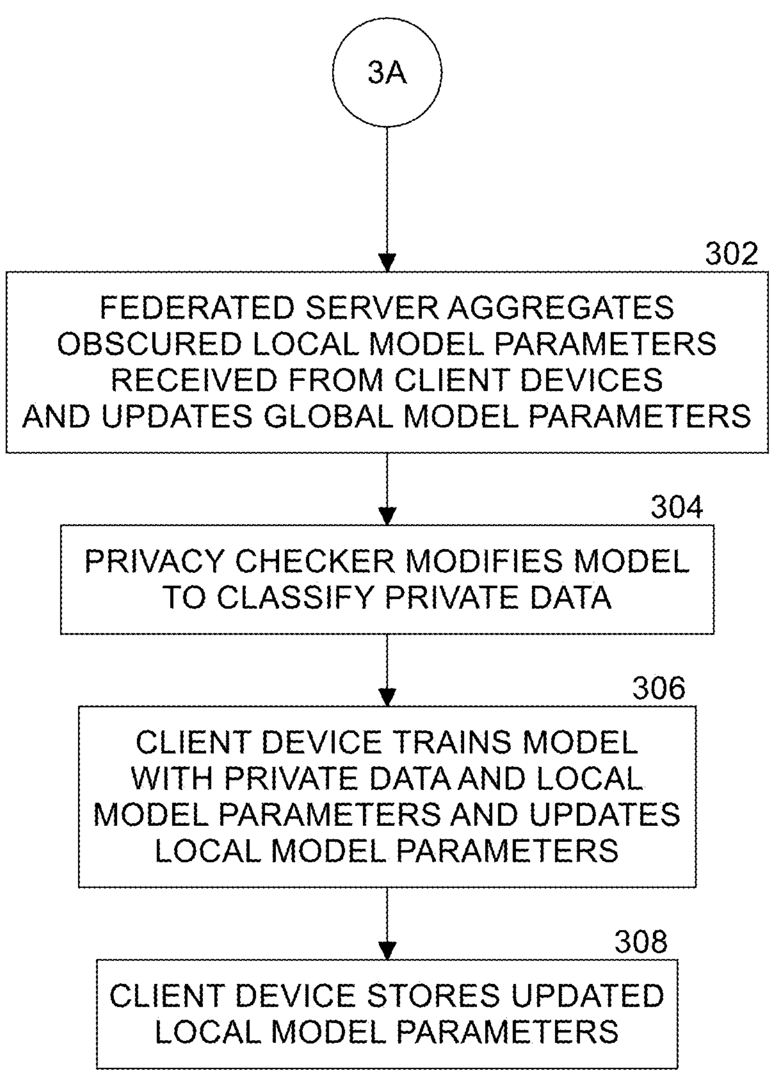

FIGS. 2 and 3 are diagrams of federated learning processing 200 according to an implementation. At block 202, federated server 102 gets public data from public database 104. At block 204, federated server 102 trains model 108 using global model parameters 106 with the public data and updates the global model parameters. At block 206, federated server 102 sends model 108 and global model parameters 106 to one or more client devices 110-1 . . . 110-N. In an implementation, federated server 102 sends the model and global model parameters to only those client devices participating in a particular round of federated learning model training processing, which may change from round to round. At block 208, each participating client device (e.g., from the participating client devices of client device 1 110-1 . . . client device N 110-N), via the privacy checker 114 associated with the client device, gets local shareable data from the client device's local shareable database (e.g., local shareable database 1 116-1 . . . local shareable database N 116-N). In an implementation, the privacy checker 114 maintains the shareable and non-shareable (e.g., private) data. Privacy checker 114 maintains the data labels and/or patterns to be inferred from pre-trained classification data. At block 210, each participating client device trains model 108 with the local shareable data and global model parameters 106 and generates local model parameters 112.

At block 212, in order to protect the privacy of the local shareable data the privacy checker 114 obscures the local model parameters 112. In an implementation, obscuring the local shareable data is performed by adding noise data to mitigate any potential statistical inference computations on the local shareable data. In other implementations, other techniques to mask or otherwise obscure the local model parameters may be used. At block 214, the client device 110 sends the obscured local model parameters 112 to federated server 102. Processing continues with connector 3A on FIG. 3.

At block 302, federated server 102 aggregates obscured local model parameters 112 received from client devices 110 and updates global model parameters 106 based at least in part on the aggregated obscured local model parameters. At block 304, the privacy checker 114 modifies the model 108 of the client device 110 to classify private data. For example, when the model is a multi-stage classifier in a classification scenario, the privacy checker adds a new classifier layer or sequence of layers on top of the global model to identify patterns that belong to private data. Thus, a new model is created on top of the global model to help identify private data. At block 306, the client device 110 trains model 108 with private data from private database 118 and local model parameters 112 and then updates the local model parameters based at least in part on the training. At block 308, the client device 110 stores the updated local model parameters 112 (e.g., stored locally and not shared with the federated server) for use in future federated learning training rounds of the model. In an implementation, the privacy checker acts as an interface between the client device and the federated server to validate server requests using the model and obscuring updates to models before sending the updates to the federated server.

The process shown in FIGS. 2 and 3 may be repeated for each successive round of model training in a federated learning computing environment. Note that the client device does not send the model 108 as trained at the client device back to federated server 102 to mitigate data privacy issues. The updated model at each client device is maintained only on that client device (that is, the updated and trained model is not accessible by the federated server). By performing successive rounds in this manner, re-training of the model is avoided, thus optimizing the use of computing resources in federated learning computing environment 100, reducing training time, and improving overall system efficiency. In an implementation, global model parameters 106 include first stage classifiers and local model parameters 112 include second stage classifiers. In an implementation, privacy checker 114 filters classifiers generated during second stage training at the client device and removes private classifiers. Filtered classifiers may be sent back to federated server 102.

Figure 4:
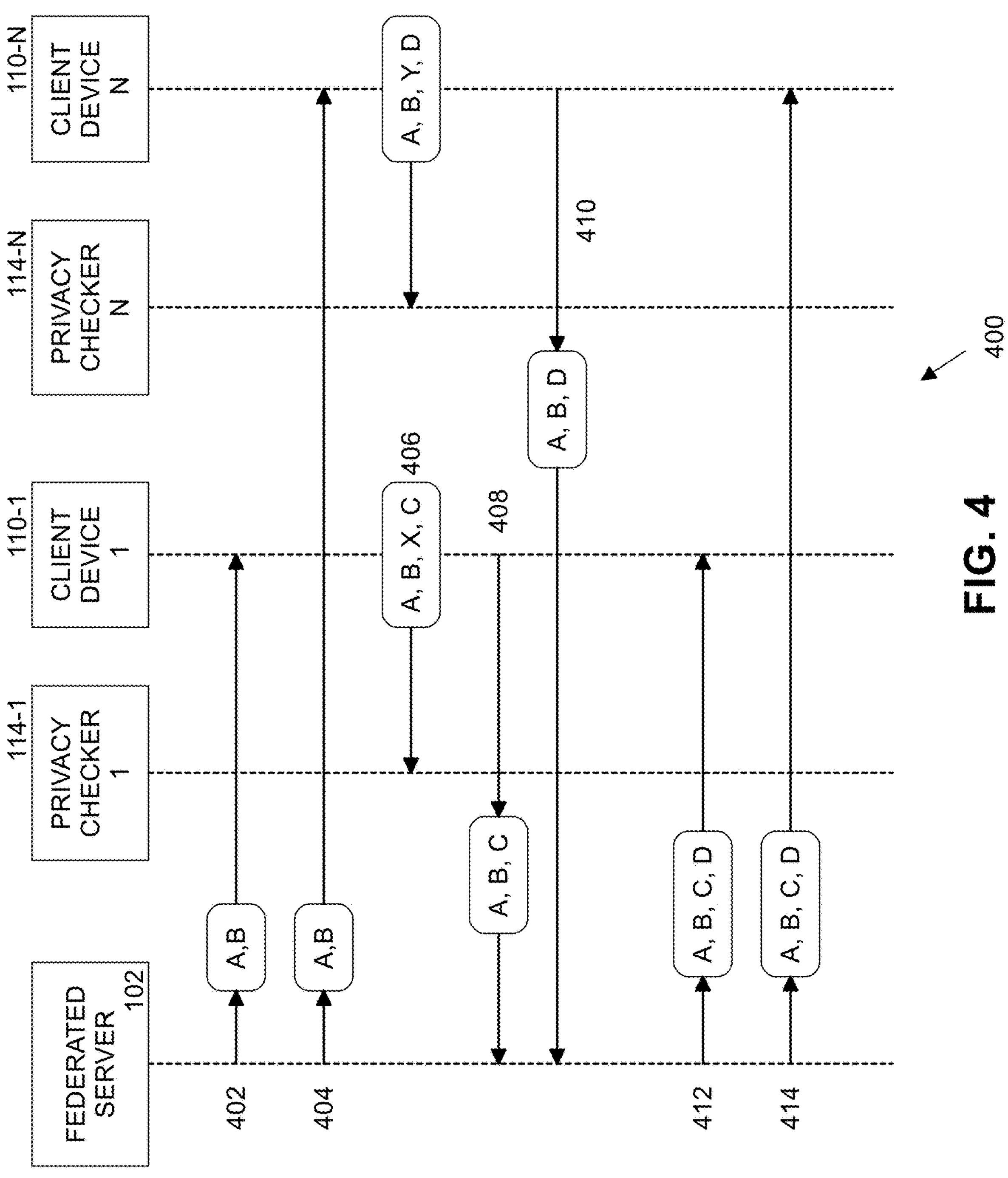
FIG. 4 is a diagram of data privacy checking processing according to an implementation.

FIG. 4 is a diagram of data privacy checking processing 400 according to an implementation. This example shows how different client devices operate on different data and send resulting data back to the federated server. At action 402, federated server 102 sends model 108 (e.g., a neural network algorithm called a classifier) and two sample classes A and B to client device 1 110-1. At action 404, federated server 102 sends model 108 and the two sample classes A and B to another client device, for example client device N 110-N. Assume X is private data from private database 1 118-1 and Y is private data from private database N 118-N. Further assume that client device 1 110-1 has access to another class C and client device N 110-N has access to another class D. Client device 1 110-1 trains the model resulting in {A, B, X, C} and client device N 110-N trains the model resulting in {A, B, Y, D}. Client device 1 110-1 adds class X on top of the classes A and B received from the federated server. Class X is maintained only on client device 1 110-1 so retraining by other client devices using X cannot occur. Similarly, client device N 110-N adds class Y on top of classes A and B and class Y is maintained only on client device N 110-N so retraining by other client devices using Y cannot occur. Thus, classes X and Y are private classes (e.g., part of private databases 118).

Privacy checker 1 114-1 filters {A, B, X, C} at action 406 to remove private class X, thus resulting in client device 1 110-1 sending {A, B, C} back to federated server 102 at action 408. Similarly, privacy checker N 114-N filters {A, B, Y, D} to remove private class Y thus resulting in client device N 110-N sending {A, B, D} back to federated server at action 410. The federated server 102 aggregates {A, B, C} and {A, B, D} to form {A, B, C, D} as updated global model parameters 106. Federated server 102 trains model 108 with the updated global model parameters and further updates the global model parameters. These updated global model parameters after model training by the federated server can then be sent to client device 1 110-1 at action 412 and to client device N 110-N at action 414. Now client device 1 110-1 can classify using local model parameters of {A, B, C, D, X} and client device N 110-N can classify using local model parameters of {A, B, C, D, Y}.

While an example manner of implementing the technology described herein is illustrated in FIGS. 1-4, one or more of the elements, processes, and/or devices illustrated in FIGS. 1-4 may be combined, divided, re-arranged, omitted, eliminated, and/or implemented in any other way. Further, the example improved federated learning computing environment 100 may be implemented by hardware, software, firmware, and/or any combination of hardware, software, and/or firmware. Thus, for example, any portion or all of the improved federated learning computing environment 100 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example hardware resources is/are hereby expressly defined to include a non-transitory computer readable storage device or storage disk such as a memory, a digital versatile disk (DVD), a compact disk (CD), a Blu-ray disk, etc., including the software and/or firmware. Further still, the example embodiments of FIGS. 1-4 may include one or more elements, processes, and/or devices in addition to, or instead of, those illustrated in FIGS. 1-4, and/or may include more than one of any or all the illustrated elements, processes and devices.

Flowcharts representative of example hardware logic circuitry, machine readable instructions, hardware implemented state machines, and/or any combination thereof is shown in FIGS. 2 and 3. The machine readable instructions may be one or more executable programs or portion(s) of an executable program for execution by processor circuitry, such as the processor circuitry 1012 shown in the example processor platform 1000 discussed below in connection with FIG. 5 and/or the example processor circuitry discussed below in connection with FIGS. 6 and/or 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 2 and 3, many other methods of implementing the example computing system may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2 and 3 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
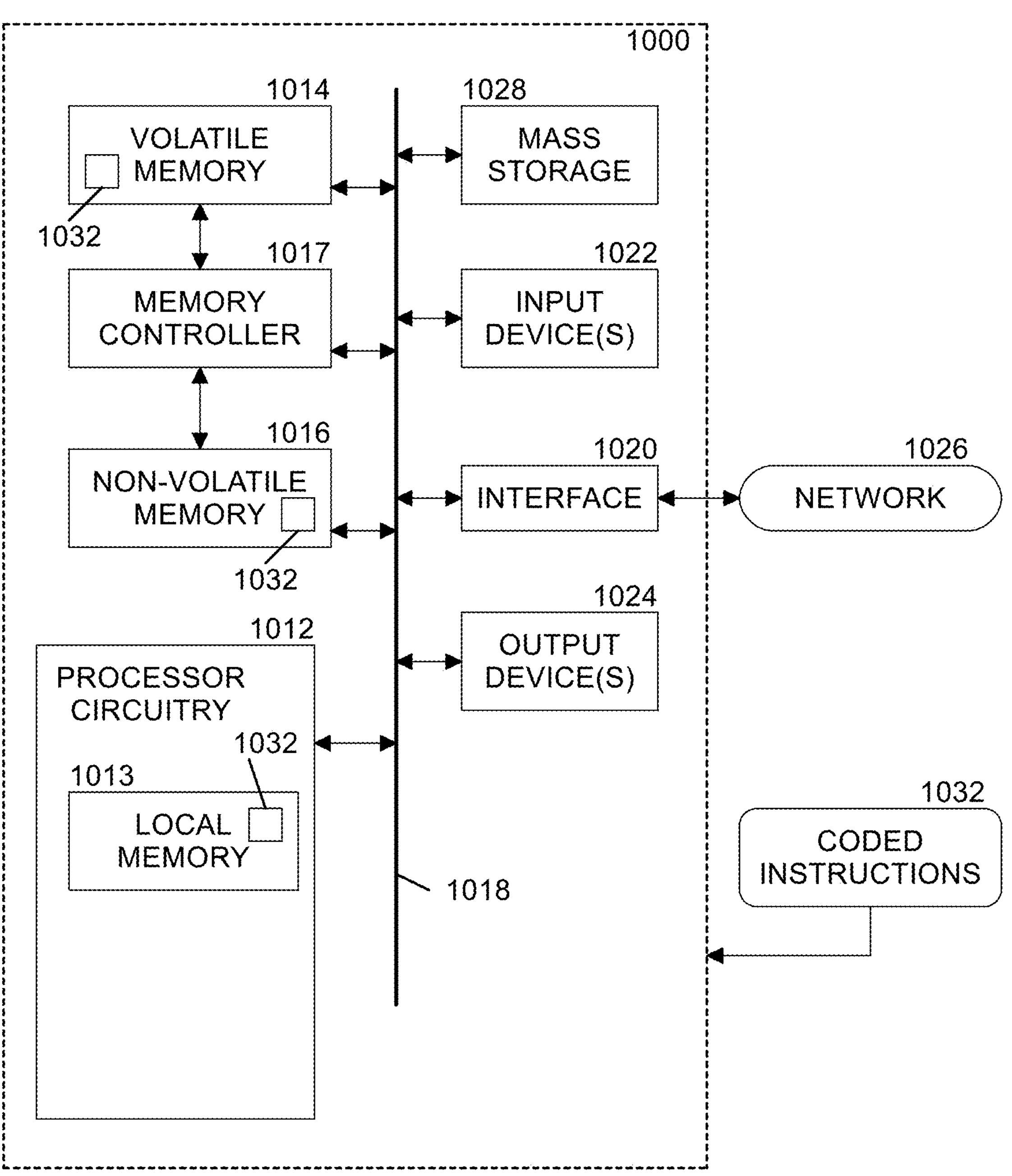
FIG. 5 is a block diagram of an example processor platform structured to execute and/or instantiate the machine-readable instructions and/or operations of FIGS. 1-4 to implement the apparatus discussed with reference to FIGS. 1-4.

FIG. 5 is a block diagram of an example processor platform 1000 structured to execute and/or instantiate the machine-readable instructions and/or operations of FIGS. 1-4. In an implementation, one or more of federated server 102, client devices 110-1 . . . 110-N, and privacy checkers 114-1 . . . 114-N may include processor platform 1000. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s)

1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine-readable instructions of FIGS. 1-4, may be stored in the mass storage device 1028, in the volatile memory 1014, in the non-volatile memory 1016, and/or on a removable non-transitory computer readable storage medium such as a CD or DVD.

Figure 6:
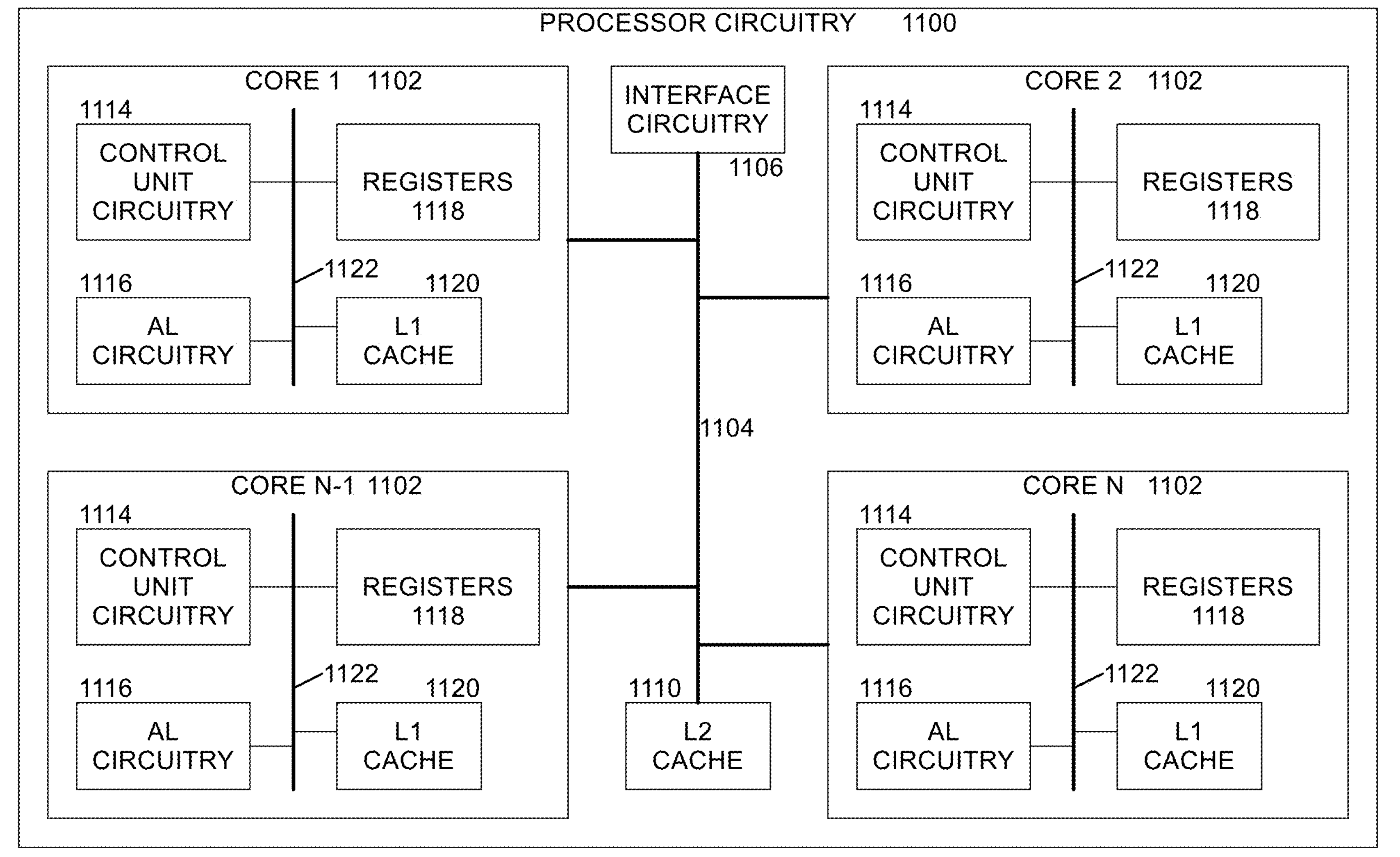
FIG. 6 is a block diagram of an example implementation of the processor circuitry of FIG. 5.

FIG. 6 is a block diagram of an example implementation of the processor circuitry 1012 of FIG. 5. In this example, the processor circuitry 1012 of FIG. 6 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all the machine-readable instructions and/or operations represented by the flowcharts of FIGS. 2 and 3.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache in local memory 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating point operations. In yet other examples, the AL circuitry 1116 may include first AL circuitry that performs integer-based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 6. Alternatively, the registers 1118 may be organized in any other arrangement, format, or structure including distributed throughout the core 1102 to shorten access time. The bus 1104 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
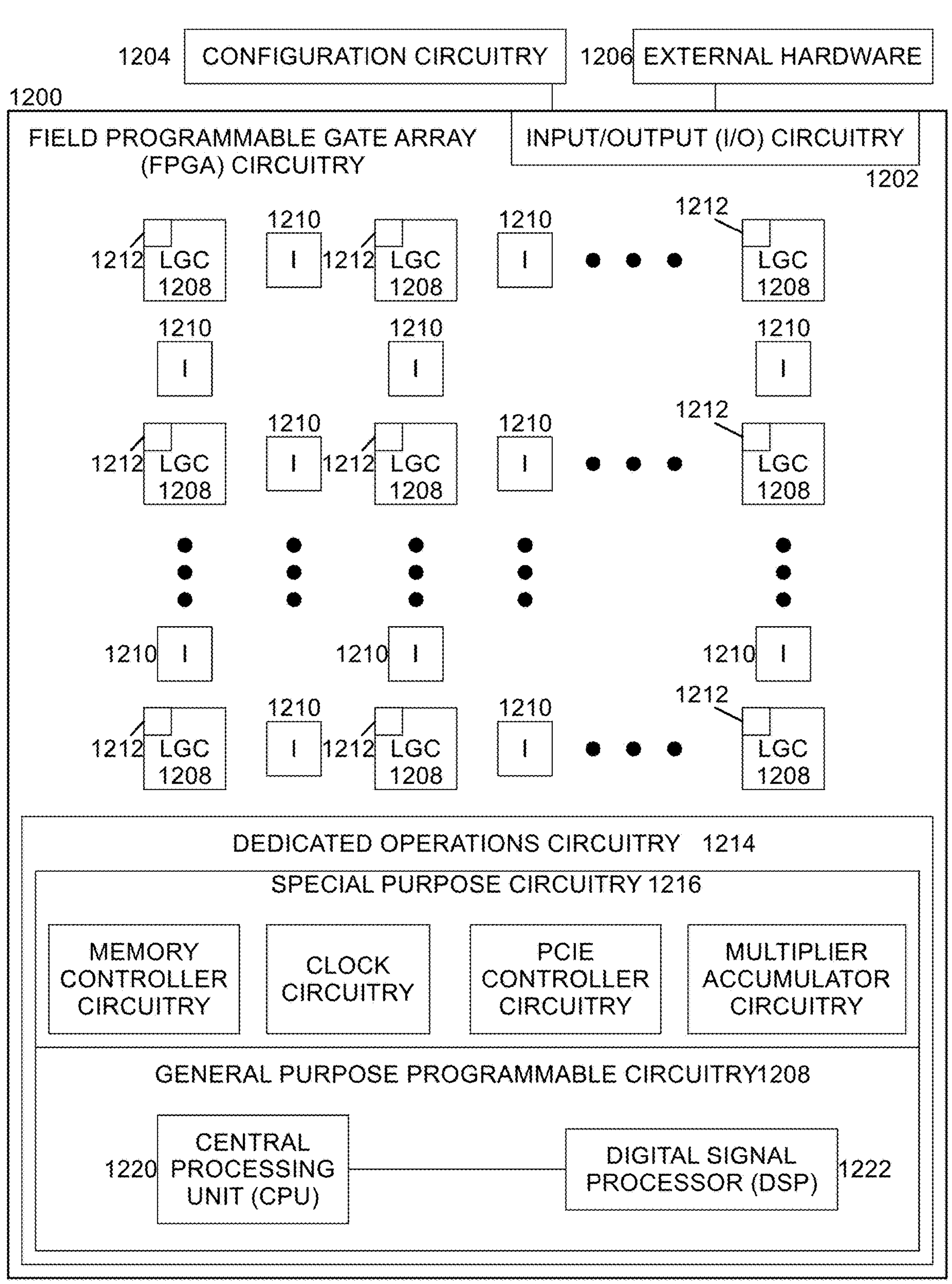
FIG. 7 is a block diagram of another example implementation of the processor circuitry of FIG. 5.

FIG. 7 is a block diagram of another example implementation of the processor circuitry 1012 of FIG. 5. In this example, the processor circuitry 1012 is implemented by FPGA circuitry 1200. The FPGA circuitry 1200 can be used, for example, to perform operations that could otherwise be performed by the example microprocessor 1100 of FIG. 6 executing corresponding machine-readable instructions. However, once configured, the FPGA circuitry 1200 instantiates the machine-readable instructions in hardware and, thus, can often execute the operations faster than they could be performed by a general-purpose microprocessor executing the corresponding software.

More specifically, in contrast to the microprocessor 1100 of FIG. 6 described above (which is a general purpose device that may be programmed to execute some or all of the machine readable instructions represented by the flowcharts of FIGS. 2 and 3 but whose interconnections and logic circuitry are fixed once fabricated), the FPGA circuitry 1200 of the example of FIG. 7 includes interconnections and logic circuitry that may be configured and/or interconnected in different ways after fabrication to instantiate, for example, some or all of the machine readable instructions represented by the flowcharts of FIGS. 2 and 3. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 2 and 3. As such, the FPGA circuitry 1200 may be structured to effectively instantiate some or all the machine-readable instructions of the flowcharts of FIGS. 2 and 3 as dedicated logic circuits to perform the operations corresponding to those software instructions in a dedicated manner analogous to an ASIC. Therefore, the FPGA circuitry 1200 may perform the operations corresponding to the some or all the machine-readable instructions of FIGS. 2 and 3 faster than the general-purpose microprocessor can execute the same.

In the example of FIG. 7, the FPGA circuitry 1200 is structured to be programmed (and/or reprogrammed one or more times) by an end user by a hardware description language (HDL) such as Verilog. The FPGA circuitry 1200 of FIG. 7, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 6. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine-readable instructions of FIGS. 2 and 3 and/or other desired operations. The logic gate circuitry 1208 shown in FIG. 7 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 7 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 6 and 7 illustrate two example implementations of the processor circuitry 1012 of FIG. 5, many other approaches are contemplated. For example, as mentioned above, modern FPGA circuitry may include an on-board CPU, such as one or more of the example CPU 1220 of FIG. 7. Therefore, the processor circuitry 1012 of FIG. 5 may additionally be implemented by combining the example microprocessor 1100 of FIG. 6 and the example FPGA circuitry 1200 of FIG. 7. In some such hybrid examples, a first portion of the machine-readable instructions represented by the flowcharts of FIGS. 2 and 3 may be executed by one or more of the cores 1102 of FIG. 6 and a second portion of the machine-readable instructions represented by the flowcharts of FIGS. 2 and 3 may be executed by the FPGA circuitry 1200 of FIG. 7.

In some examples, the processor circuitry 1012 of FIG. 5 may be in one or more packages. For example, the microprocessor 1100 of FIG. 6 and/or the FPGA circuitry 1200 of FIG. 7 may be in one or more packages. In some examples, an XPU may be implemented by the processor circuitry 1012 of FIG. 5, which may be in one or more packages. For example, the XPU may include a CPU in one package, a DSP in another package, a GPU in yet another package, and an FPGA in still yet another package.

Figure 8:
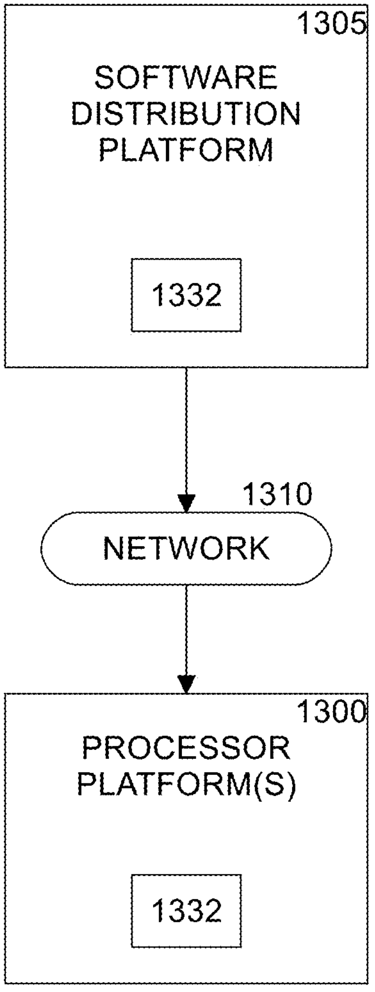
FIG. 8 is a block diagram illustrating an example software distribution platform to distribute software such as the example machine readable instructions of FIG. 5 to hardware devices owned and/or operated by third parties.

A block diagram illustrating an example software distribution platform 1305 to distribute software such as the example machine readable instructions 1032 of FIG. 7 to hardware devices owned and/or operated by third parties is illustrated in FIG. 8. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 7. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine-readable instructions 1032, which may correspond to the example machine readable instructions, as described above. The one or more servers of the example software distribution platform 1305 are in communication with a network 1310, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1032 from the software distribution platform 1305. For example, the software, which may correspond to the example machine readable instructions described above, may be downloaded to the example processor platform 1300, which is to execute the machine-readable instructions 1032 to implement the methods described above and associated federated learning computing environment 100. In some examples, one or more servers of the software distribution platform 1305 periodically offer, transmit, and/or force updates to the software (e.g., the example machine readable instructions 1032 of FIG. 7) to ensure improvements, patches, updates, etc., are distributed and applied to the software at the end user devices.

In some examples, an apparatus includes means for data processing of FIGS. 1-4. For example, the means for processing may be implemented by processor circuitry, processor circuitry, firmware circuitry, etc. In some examples, the processor circuitry may be implemented by machine executable instructions executed by processor circuitry, which may be implemented by the example processor circuitry 1012 of FIG. 5, the example microprocessor 1100 of FIG. 6, and/or the example Field Programmable Gate Array (FPGA) circuitry 1200 of FIG. 7. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide improved privacy in a federated learning environment. The disclosed systems, methods, apparatus, and articles of manufacture improve the performance of implementing privacy in a federated learning in a computing environment. The disclosed systems, methods, apparatus, and articles of manufacture are accordingly directed to one or more improvement(s) in the operation of a machine such as a computer or other electronic and/or mechanical device.

Examples

The following examples pertain to further embodiments. Specifics in the examples may be used anywhere in one or more embodiments. Example 1 is a method including receiving a model trained by a federated server with public data using global model parameters; getting local shareable data from a local shareable database; training the model with the local shareable data using the global model parameters to generate local model parameters; obscuring the local model parameters; sending the local model parameters to the federated server; modifying the model to classify private data; and training the model with the private data using the local model parameters and updating the local model parameters. In Example 2, the subject matter of Example 1 optionally includes storing the local model parameters for use in training the model with the local shareable data using the global model parameters to generate the local model parameters in a subsequent round of federated learning. In Example 3, the subject matter of Example 1 optionally includes wherein the public data is stored in a public database accessible by the federated server and the private data is stored in a private database accessible by only by a client device training the model with the private data. In Example 4, the subject matter of Example 1 optionally includes wherein the global model parameters received in a subsequent round of federated learning comprise aggregated updates of obscured local model parameters from a plurality of client devices.

In Example 5, the subject matter of Example 1 optionally includes wherein the model comprises a machine learning (ML) model. In Example 6, the subject matter of Example 1 optionally includes wherein the local shareable data comprises a portion of the public data. In Example 7, the subject matter of Example 1 optionally includes receiving and training the model by a client device in response to the client device participating in a round of federated learning. In Example 8, the subject matter of Example 1 optionally includes wherein obscuring the local model parameters comprises adding noise data to the local model parameters to mitigate potential statistical inferences of the local shareable data from the local model parameters. In Example 9, the subject matter of Example 1 optionally includes wherein the model is a multi-stage classifier and modifying the model to classify private data comprises adding a new classifier layer to the model to identify a pattern that belongs to the private data. In Example 10, the subject matter of Example 9 optionally includes wherein the model as modified and trained with private data at a client device is not accessible by the federated server.

Example 11 is at least one machine-readable storage medium comprising instructions which, when executed by at least one processor, cause the at least one processor to receive a model trained by a federated server with public data using global model parameters; get local shareable data from a local shareable database; train the model with the local shareable data using the global model parameters to generate local model parameters; obscure the local model parameters; send the local model parameters to the federated server; modify the model to classify private data; and train the model with the private data using the local model parameters and updating the local model parameters. In Example 12, the subject matter of Example 11 optionally includes instructions which, when executed by at least one processor, cause the at least one processor to store the local model parameters for use in training the model with the local shareable data using the global model parameters to generate the local model parameters in a subsequent round of federated learning. In Example 13, the subject matter of Example 11 optionally includes wherein the public data is stored in a public database accessible by the federated server and the private data is stored in a private database accessible by only by a client device training the model with the private data.

In Example 14, the subject matter of Example 11 optionally includes wherein the global model parameters received in a subsequent round of federated learning comprise aggregated updates of obscured local model parameters from a plurality of client devices. In Example 15, the subject matter of Example 11 optionally includes wherein instruction to obscure the local model parameters comprise instructions to add noise data to the local model parameters to mitigate potential statistical inferences of the local shareable data from the local model parameters. In Example 16, the subject matter of Example 11 optionally includes wherein the model is a multi-stage classifier and instructions to modify the model to classify private data comprise instructions to add a new classifier layer to the model to identify a pattern that belongs to the private data.

Example 17 is a computing system including a memory to store instructions; and a processor coupled to the memory to execute the instructions to receive a model trained by a federated server with public data using global model parameters; get local shareable data from a local shareable database; train the model with the local shareable data using the global model parameters to generate local model parameters; obscure the local model parameters; send the local model parameters to the federated server; modify the model to classify private data; and train the model with the private data using the local model parameters and updating the local model parameters.

In Example 18, the subject matter of Example 17 optionally includes wherein the public data is stored in a public database accessible by the federated server and the private data is stored in a private database accessible by only by a client device training the model with the private data. In Example 19, the subject matter of Example 17 optionally includes wherein the global model parameters received in a subsequent round of federated learning comprise aggregated updates of obscured local model parameters from a plurality of client devices. In Example 20, the subject matter of Example 17 optionally includes wherein the processor to obscure the local model parameters comprise the processor to add noise data to the local model parameters to mitigate potential statistical inferences of the local shareable data from the local model parameters.

Example 21 is an apparatus operative to perform the method of any one of Examples 1 to 10. Example 22 is an apparatus that includes means for performing the method of any one of Examples 1 to 10. Example 23 is an apparatus that includes any combination of modules and/or units and/or logic and/or circuitry and/or means operative to perform the method of any one of Examples 1 to 10. Example 24 is an optionally non-transitory and/or tangible machine-readable medium, which optionally stores or otherwise provides instructions that if and/or when executed by a computer system or other machine are operative to cause the machine to perform the method of any one of Examples 1 to 10.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method comprising:

receiving, by a computing device, a model trained with public data based on global model parameters, wherein the model is received from a federated server device;

training the model with private data using the local model parameters as model parameters and updating the local model parameters;

retraining the trained model with private data using updated local model parameters as initialization parameters;

obscuring the updated local model parameters to secure the private data to protect privacy of local shareable data, wherein the local shareable data is received from a local shareable database, wherein obscuring the local model parameters comprises adding noise data to the local model parameters to mitigate potential statistical inferences of the private data associated with the local model parameters; and transmitting, to the federated server device, the retrained model based on the obscured updated local model parameters such that the private data remains classified.

2. The method of claim 1, wherein the retrained model to classify the private data, wherein the public data is stored in a public database accessible by the federated server device, and wherein the private data is stored in a private database accessible by the computing device having authorization to access the private data, wherein the model comprises a machine-learning model.

3. The method of claim 1, wherein modifying the retrained model to classify the private data comprises adding a new classifier layer to the retrained model to identify a pattern associated with the private data.

4. The method of claim 1, wherein the computing device comprises processing circuitry coupled to a memory, the processing circuitry having application processing circuitry or graphics processing circuitry.

5. A computing device comprising:

processing circuitry coupled to a memory, the processing circuitry to:

receive a model trained with public data based on global model parameters, wherein the model is received from a federated server device;

train the model with private data using the local model parameters as model parameters and updating the local model parameters;

retrain the trained model with private data using local model parameters as initialization parameters;

obscure the updated local model parameters to secure the private data to protect privacy of local shareable data, wherein the local shareable data is received from a local shareable database, wherein obscuring the local model parameters comprises adding noise data to the local model parameters to mitigate potential statistical inferences of the private data associated with the local model parameters; and transmit, to the federated server device, the retrained model based on the obscured updated local model parameters such that the private data remains classified.

6. The computing device of claim 5, wherein the retrained model to classify the private data, wherein the public data is stored in a public database accessible by the federated server device, and wherein the private data is stored in a private database accessible by the computing device having authorization to access the private data, wherein the model comprises a machine-learning model.

7. The computing device of claim 5, wherein modifying the retrained model to classify the private data comprises adding a new classifier layer to the retrained model to identify a pattern associated with the private data.

8. The computing device of claim 5, wherein the processing circuitry comprises application processing circuitry or graphics processing circuitry.

9. At least one non-transitory computer-readable medium having stored thereon instructions which, when executed, cause a computing device to perform operations comprising:

receiving a model trained with public data based on global model parameters, wherein the model is received from a federated server device;

training the model with private data using the local model parameters as model parameters and updating the local model parameters;

retraining the trained model with private data using local model parameters as initialization parameters;

obscuring the updated local model parameters to secure the private data to protect privacy of local shareable data, wherein the local shareable data is received from a local shareable database, wherein obscuring the local model parameters comprises adding noise data to the local model parameters to mitigate potential statistical inferences of the private data associated with the local model parameters; and transmitting, to the federated server device, the retrained model based on the obscured updated local model parameters such that the private data remains classified.

10. The non-transitory computer-readable medium of claim 9, wherein the retrained model to classify the private data, wherein the public data is stored in a public database accessible by the federated server device, and wherein the private data is stored in a private database accessible by the computing device having authorization to access the private data, wherein the model comprises a machine-learning model.

11. The non-transitory computer-readable medium of claim 9, wherein modifying the retrained model to classify the private data comprises adding a new classifier layer to the retrained model to identify a pattern associated with the private data.

12. The non-transitory computer-readable medium of claim 9, wherein the computing device comprises processing circuitry having application processing circuitry or graphics processing circuitry.

* * * * *